United States Patent [19]

Grandmougin

[11] Patent Number: 5,089,886
[45] Date of Patent: Feb. 18, 1992

[54] DEVICE FOR THE REMOTE TRANSMISSION OF SIGNALS AND IN PARTICULAR VIDEO SIGNALS

[75] Inventor: Gérard Grandmougin, Strasbourg, France

[73] Assignee: Visicable, Paris, France

[21] Appl. No.: 527,720

[22] Filed: May 24, 1990

Related U.S. Application Data

[63] Continuation of Ser. No. 243,029, filed as PCT/FR88/00046, Jan. 27, 1988, abandoned.

[30] Foreign Application Priority Data

Feb. 4, 1987 [FR] France ................... 87 01338

[51] Int. Cl.⁵ .......................................... H04N 7/10
[52] U.S. Cl. .................................... 358/86; 455/5; 375/36
[58] Field of Search ............... 358/86; 455/3, 5; 375/36

[56] References Cited

U.S. PATENT DOCUMENTS

| | | | |
|---|---|---|---|
| 1,814,453 | 7/1931 | Osborne | 361/119 |
| 3,290,653 | 12/1966 | Slattery et al. | 375/36 |
| 4,035,838 | 7/1977 | Bassani et al. | 358/86 |
| 4,054,910 | 10/1977 | Chou et al. | 358/86 |
| 4,112,253 | 9/1978 | Wilhelm | 375/36 |
| 4,621,170 | 11/1986 | Picandet . | |
| 4,707,672 | 11/1987 | Duret et al. . | |
| 4,751,607 | 6/1988 | Smith . | |

FOREIGN PATENT DOCUMENTS

| | | |
|---|---|---|
| 2305077 | 10/1976 | France . |
| 2584555 | 1/1987 | France . |
| 57-17242 | 1/1982 | Japan ................ 375/36 |
| 1234186 | 6/1971 | United Kingdom . |
| 87/00712 | 1/1987 | World Int. Prop. O. . |

OTHER PUBLICATIONS

"Rabbit the VCR 'Multiplying' System", Owner's Manual, Rabbit Systems, Inc., Santa Monica, Calif.

Primary Examiner—James L. Dwyer
Assistant Examiner—Wing F. Chan
Attorney, Agent, or Firm—Oblon, Spivak, McClelland, Maier & Neustadt

[57] ABSTRACT

A device for the transmission of signals, including video signals, between at least one transmitting assembly and at least receiving assembly by means of a twin-wire connection line provided at each end with a symmetric transformer and supplied by at least one current generator, wherein the generator supplies symmetrically on the wires of the line and is controlled by the signals to be transmitted, of which the frequency is between 50 Hz and 30 MHz, the line being balanced at each end by an impedance equal to its characteristic impedance.

18 Claims, 4 Drawing Sheets

DEVICE FOR THE REMOTE TRANSMISSION OF SIGNALS AND IN PARTICULAR VIDEO SIGNALS

This application is a continuation of application Ser. No. 07/243,029, filed as PCT/FR88/00046, Jan. 27, 1988, now abandoned.

FIELD OF THE INVENTION

The present invention is a device for the remote transmission of signals, and in particular video signals, by two leads of small diameter, not sheathed, which can be easily put in position, notably between two locations or two existing installations, separated from one another.

BACKGROUND OF THE INVENTION

Many signal and/or data transmission devices between two distant points separated by a determined distance are already known in the art. In particular, many systems using connections by coaxial cables or transmission lines called "buses" are known. However, with these standard systems, and when the task is to transmit video signals, it is generally necessary that said signals are frequency or amplitude modulated and that they do not remain in the baseband if one wishes to avoid a quick degradation of said signals, which is all the more important as the diameter of the coaxial cables used is smaller. With cables of large diameter, the degradation of the signal is less but the installation is costly and above all less convenient. The problem is forming passages in the walls through which the large diameter cables are to pass to provide connections with the equipment at said locations. For cables of smaller diameter, a frequency or amplitude modulation of the signals is always necessary, thereby making necessary the use of a modulator and then of a demodulator, introducing some distortion and limitations. Moreover, some of said systems designed for long range transmission of signals from the output of a tape recorder or those which are to be applied to the input of a television set of a known type, and using the demodulator present in the standard television sets, are incompatible with the use of simple visualization monitors.

The present invention is a device allowing the transmission of at least one signal, such as but not limited to a a video signal, maintained in the baseband without modulation. The device is reliable, simple to produce and allows transmitting a signal without distrubing it, and without this signal disturbing the environment, or without or itself being disturbed by said environment. The device also has a wide pass-band, excellent linearity and a signal/noise ratio remaining satisfactory across said band.

More particularly, the invention is directed to a transmission device which allows transferring signals corresponding to information of any nature and of the type which can be found in many industrial as well as domestic applications. Thus, in the case of hotels and communities for example, the present device allows advantageously communication from a given central station, or more generally between several stations. The present device can transmit various telephonic, radio, or television messages, information relating to security, the supervision and the eventual control of inlets and outlets, the change of codes or door locks, and the usage of some services, wake-up calls, etc. In such applications, it is obvious that when the account of information that can be transmitted by leads of small section becomes more important, the multiplication of unaesthetic and bulky cables and the disadvantages due to setting them in place increases in proportion. The limitation to the twin-wire line of the invention, each having a diameter which can be notably less than 1 mm, allows easy passage of the lines underneath washboards, between floor planks, underneath doors, and underneath carpets. This is a great advantage particularly in homes or hotels.

On the other hand, in the video and transmission of television images field, it is known that said images come more and more frequently from various sources, notably tape recorders, cameras, converters of signals transmitted by coaxial cables or optic fiber beams, video disc readers, and television sets. The problem is establishing communication upon request from each of said sources at will with other receivers or monitors at the disposal of the users. Outside even the hotel or community field, for example a simple domestic usage, one can easily imagine the possibility of establishing inside the same home a transmission assembly, possibly connected with an audiophonic assembly, allowing a remote transmission from one room to the other of the television images accompanied by sound signals and also remotely controlling the sources of said signals.

The present invention is therefore directed to a multi-input transmission device for conveying signals, such as video signals, but possibly of an other nature, which can be transmitted according to the standards of any system (SECAM, PAL, NTSC, D2 MAC PAQUET . . . ) and are from any appropriate source (a receiver for a radio transmitter, a receiver antenna for transmissions from satellites, cables, etc. The device avoids the use of transmission coaxial that are liable to introduce bulky and costly interference in the various signals transmitted, especially if the cables are of a great length.

Transmission systems using two leads of small diameter are certainly already known. Thus, FR-A-2 584 555 refers to a wide band signal transmission device in a network, possibly of video-communication with a star-shaped structure, where the video information can be remotely transmitted to a plurality of distinct receiving sets. In such systems, the signals to be transmitted are adapted in an input equipment and transmitted to an output equipment via a balanced and symmetrical twin-wire line through a switching matrix including M lines and N columns.

The matrix is associated with an address memory allowing selection of the chosen switching address. Finally in said systems, the transmitted signals are filtered in the input equipment so as to separate the low and high frequency components, each of which being the object of a transmission on the twin-wire line according to a different mode. Regarding the high frequency component of the signal, it is sent in a differential mode through a transformer, the two components going, in the output equipment, through a summation device for reconstituting the signal. Such a device is costly, complex and risks introducing signal distortion with a poor signal/noise ratio, above all if the frequency band is made relatively wider.

With respect to the prior art thus shown, the present invention has the advantage of a very simple device, allowing transmitting in optimal conditions any signals received at its input, whatever the standard used. With the present device it is not necessary to separate the high and low frequency signals in the signal spectrum, instead said signal can be immediately remotely transmitted in its whole extent by the two leads of the line equipped with symmetrical transformers, due to an appropriate adaptation and a balancing of the line avoiding the radiation of said line.

To this effect, the signal transmission device, transmitting signals between at least one transmitter assembly and at least one receiver assembly by means of a twin-wire connecting line of small diameter, equipped at each end with a symmetrical transformer and powered by at least one current generator, is characterized in that the current generator outputs symmetrically to the line and is controlled by the signals to be transmitted. Said signals generally have a frequency between 50 Hz and 30 MHz and the line is balanced at each end by an impedance equal to its characteristic impedance.

Advantageously, the two identical wires are not shielded and each have a diameter less than or equal to 1 mm, it being understood here that the invention has its essential advantages in the use of leads of small diameter but larger diameter wires can be used. Moreover, although it is obvious that the wires of the line have preferentially a circular cross-section, they could also be flat, notably in the shape of tapes placed on an insulating support or imbedded in said support, without departing from the scope of the invention.

Preferably also, the symmetrical transformers fitting out each end of the two wire lines have magnetic core with each winding mounted in series with one of the wires of the line. According to a particular embodiment, the windings of the symmetrical transformers are themselves made of the line wires. These transformers strongly reduce line noise without damping the high frequency components of the transmitted signals.

According to another feature of the invention, each transmitting assembly includes two current generators, one controlled by a signal and the other by the inverse of that same signal and delivering symmetrically on one and the other of the line wires, said generators being mounted in series with a matching impedance unit having a value which is equal to the line characteristic impedance. Preferably, the impedance unit in series with the generators includes resistors and a capacitor adapted to separate the continuous component from the signals to be transmitted. Moreover, the matching impedance unit is advantageously formed by means of two equal impedance units mounted in series and with the node between the two units connected to the ground via a capacitor. Likewise, in each receiver assembly, the matching impedance unit of the line is mounted in parallel on said line and is as such made of two equal impedance units mounted in series with a medium point connected to the ground.

According to another advantageous feature of the invention, each receiver assembly includes two current generators supplying the power supply current to said assembly. Moreover, and according to another feature, the receiver assembly includes a complementary current generator, operating symmetrically, with its voltage controlled by modulated signals, distinct from those controlling the generators of the transmitter assembly, whereby said signals can be in particular remote controlled signals circulating on the twin-wire line in a direction reverse to that of the signals received from the transmitter.

BRIEF DESCRIPTION OF DRAWINGS

Other characteristics of a signal transmission device according to the invention will become apparent from the following description of an embodiment, given as an indicative and non limiting example, with reference to the accompanying drawings wherein.

DETAILED DESCRIPTION OF THE INVENTION

Generally, it is known from theory and experience that in a signal transmission installation using a twin-wire line, it is possible to considerably reduce the radiation created by the assembly of the two wires by reducing the dissymmetry of the operation during transmission. The device according to the invention basically takes advantage of this observation.

Figure 1:
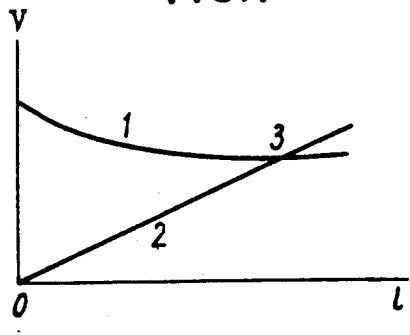
FIG. 1 is a graphic diagram showing on the ordinate the maximum voltage of a signal transmitted as a function of the length of the transmission wires in any line, plotted on the abscissa.

In FIG. 1 is shown on curve 1 the maximum voltage of a signal transmitted as a function of the length of the transmission wires for a given maximum radiation limit. Curve 1 which is naturally decreasing shows in practice irregularities if the transmission is not symmetrical, the wires behaving as an antenna. On said same FIG. 1 is shown by curve 2 the influence of the voltage created by the interference due to the outer electrical field on the line, also as a function of the wire length.

One can thus establish that this influence increases substantially linearly when the transmission wire path is rectilinear. On the contrary, if said wires follow complex paths, which is generally case of the applications in interest where the signals have to be transmitted between two distant locations by the line following an appropriate path which conceals it as best as possible, curve 2 becomes complex since its slope depends on very many factors and particularly on the frequency of the outer field and on the shape of said field. One infers therefrom that for better transmission it is advantageous that the intersection point 3 of curves 1 and 2 be as remote as possible from the abscissa axis for a more efficient transmission.

This condition is substantially met when there is a symmetry in the transmission line. In fact, the greater the symmetry the higher curve 1 is on the diagram of FIG. 1 and the smaller the slope of curve 2, which permits a greater possible length of transmission without interference. Moreover, the use of such a symmetry in the line avoids the need for shielding the conducting wires.

Therefore, the present device takes advantage of the hereabove observations. To this effect, it includes substantially a transmission line with two wires of small diameter of the order of 1 mm or less, connecting a transmitter assembly to a receiver assembly. Said wires are cylindrical and parallel, maintained in position by an appropriate insulating material. The transmitter assembly includes a variable number of inputs, adapted to be connected to various signal sources and a receiver assembly having the same or a different number of outputs which can be connected to user apparatus, receiving and exploiting signals incoming from the transmitter and others arriving on the line. The twin-wire transmission line and the respective transmitter and receiver assemblies form the basis of the device. The transmitter and receiver can be mounted symmetrically or be each transmitting and receiving. Moreover, one can foresee on the line the possible need for intermediate transmitters or receivers so that a signal can be received and then retransmitted in order to ensure its integrity along the line to other receivers. Likewise, complementary signals which are superimposed on the line with those that are already transmitted by said line can be introduced at each intermediate receiver, without interfering with said signals and with the operation of the line.

According to the invention, at each end of the transmission line is connected, through symmetrical transformers, current generators having their characteristics and control mode chosen according to the invention for ensuring a perfect symmetrical balancing of the whole assembly. In particular, each current generator is designed in such manner as to allow sending a signal and/or a current on the line or to take a signal from said line, without modifying the loading impedance value of said line. In the transmitting assembly, the current generators have their input voltage controlled in a symmetrical way by the signals to be transmitted. In the receiver assembly, the generators are connected to the ends of the transmition wires, preferably and as will be seen hereafter via a diode bridge in order to avoid polarity errors when connecting the wires.

In a most general way, the device is therefore designed for providing a permanent balancing of the line as regards the direct voltages, particulary by avoiding any possibility of shorts to ground. Moreover, at the level of each transmitter and/or receiver, a particular balancing with respect to the line symmetry is also ensured by means of an impedance unit mounted in series with the current generators, said impedance unit is in turn parallel to the transmission wires in order to form, each time, a circuit where the alternating voltages involved are balanced.

Figure 2:
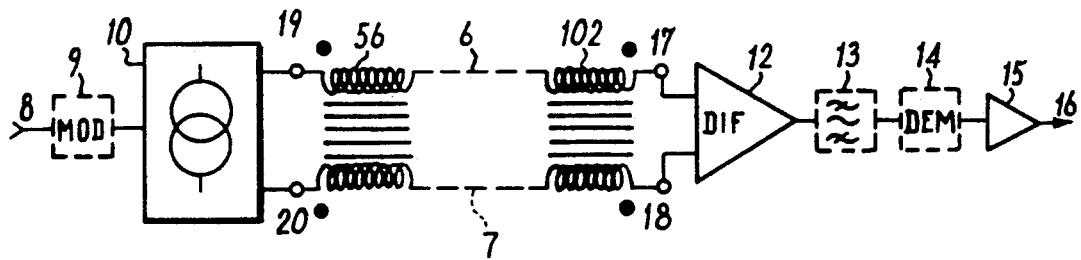
FIG. 2 is a schematic block diagram of the transmission device according to the invention.

In FIG. 2, the line transmission wires are respectively designated by reference numerals 6 and 7. The signals to be transmitted, arising from a source (not shown) are applied at 8 and, if necessary, are frequency or amplitude modulated. In particular, if the input signals are video signals, they are used just as they are, in the baseband without modulation; on the contrary, if the signals are of another nature, for example audio signals which usually accompany the video signals, they are conveniently modulated in order on be superimposed to the video signals.

The resulting signal controls then the input voltage of a current generator assembly 10, followed by a symmetrical transformer 56, preferably with a magnetic core. After transmission by wires 6 and 7 of the line, the signals flow through a second symmetrical transformer 102, also with a magnetic core, and through a differential amplifier 12, followed generally by a filter 13 in order to permit only the passage of the required signals. The differential amplifier 12 eliminates in particular the asymmetrical voltages on wires 6 and 7 due to outside interferences, while filter 13 separates the elementary signals thus transmitted. At the output of the filter, the signals are possibly demodulated in a demodulator circuit 14, then amplified at 15 prior to reaching the device output 16.

Transformers 56 and 102 are directly part of the transmission line formed by leads 6 and 7. Preferably, these transformers include windings coiled by means of twin-wire leads. Advantageously, the windings of the transformers are even made by the wires 6 and 7 of the line. In the drawing of FIG. 2, reference numerals 17 and 18 on the one hand, 19 and 20 on the other hand, show schematically the connections of the line with the transmitting and receiving assemblies, the black dots in the drawing showing in a schematic way the winding direction of the transformers.

Figure 3:
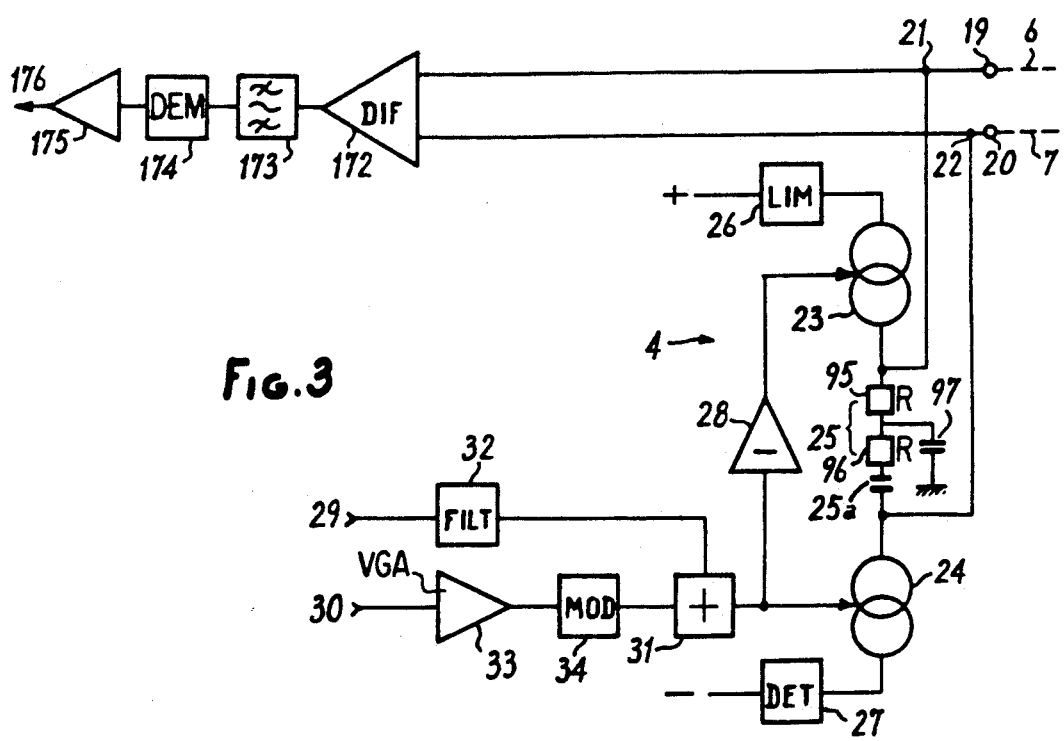
FIG. 3 shows in greater detail the device transmitter assembly.

FIG. 3 shows in more detail the embodiment of a transmitter assembly 4, used in the device according to the invention.

As seen in FIG. 3, one inputs at 21 and 22 on wires 6 and 7 of the line the signals to be transmitted, supplied by transmitter 4 in the following manner: two current generators 23 and 24, having identical characteristics, are connected to the transmission line at points 21 and 22. The current generators receive the signal to be transmitted (from adder 31) as an input voltage and output a current representative of the input voltage signal and without disturbing the symmetry of the system. It is noted that the current generators contemplated for use in the present invention are commonplace and a number of designs would perform satisfactorily. The terminals of generators 23 and 24 are saturated by a loading impedance unit 25 in series with a capacitor 25a, the capacitor providing for the separation of the alternating and direct components of the current.

Impedance unit 25 is equal to the characteristic impedance of the line. It is preferably formed by means of two equal resistors, respectively 95 and 96, having each a resistance value equal to half the characteristic impedance of the line, the node between the two resistors being connected to ground through a capacitor 97. The other terminals of generators 23 and 24 are respectively connected to a positive power supply via a current limiter 26 and to a negative power supply. A current detector 27 can be provided in the circuit of the generators.

The current limiter 26 protects the generators, notably in the accidental event of a short circuit between the transmission wires 6 and 7 or between ground and either lead.

On the other hand, the two generators 24 and 23 are fed by the signal from the adder 31 and its inverse, respectively, by means of inverter 28. Of course, the number of inputs can be different from two, whereby the transmitter can receive at the input as many signals as necessary on as many parallel channels.

In the example shown, it is assumed that a video signal and an audio signal are inputted at 29 and 30, respectively. The video signal is filtered at 32 and the audio signal can be amplified by a variable gain amplifier 33 and modulated at 34 before the two signals are added at 31. The two signals are frequency separated in the transmitter passband, the transmitter of the present invention generally processing signals between 50 Hz and 30 MHz.

The mounting of transmitter 4 with its current generators 23 and 24 in turn mounted in series with impedance 25 which is equal to the line characteristic impedance thus allows passing from an asymmetric operation at the input at 29 and 30 for the signals, to a perfectly symmetrical operation at the output of the generators, notably at 21 and 22 where said signals are introduced on the transmission line. At the output of the generators, the resulting signal transmitted on the line, which is equal to the difference of the voltages on the wires of said line, represents the relative value of the signals at the transmitter input.

The symmetrical operation thus provided on the line two leads avoids therefore an interference radiation during transmission as well as the effect of interference fields at the reception.

The circuit of FIG. 3 also contains means for receiving signals, for example remote control signals, propagating on the same transmission line but in an opposite direction to those transmitted by transmitter 4. The means includes a differential amplifier 172 mounted between points 21 and 22, followed by a passband filter 173, a demodulator 174, and an amplifier 175. The signals outputted at 176 can be used to control the selection of signals to be introduced into the transmitter, corresponding in this example to points 29 and 30.

Figure 4:
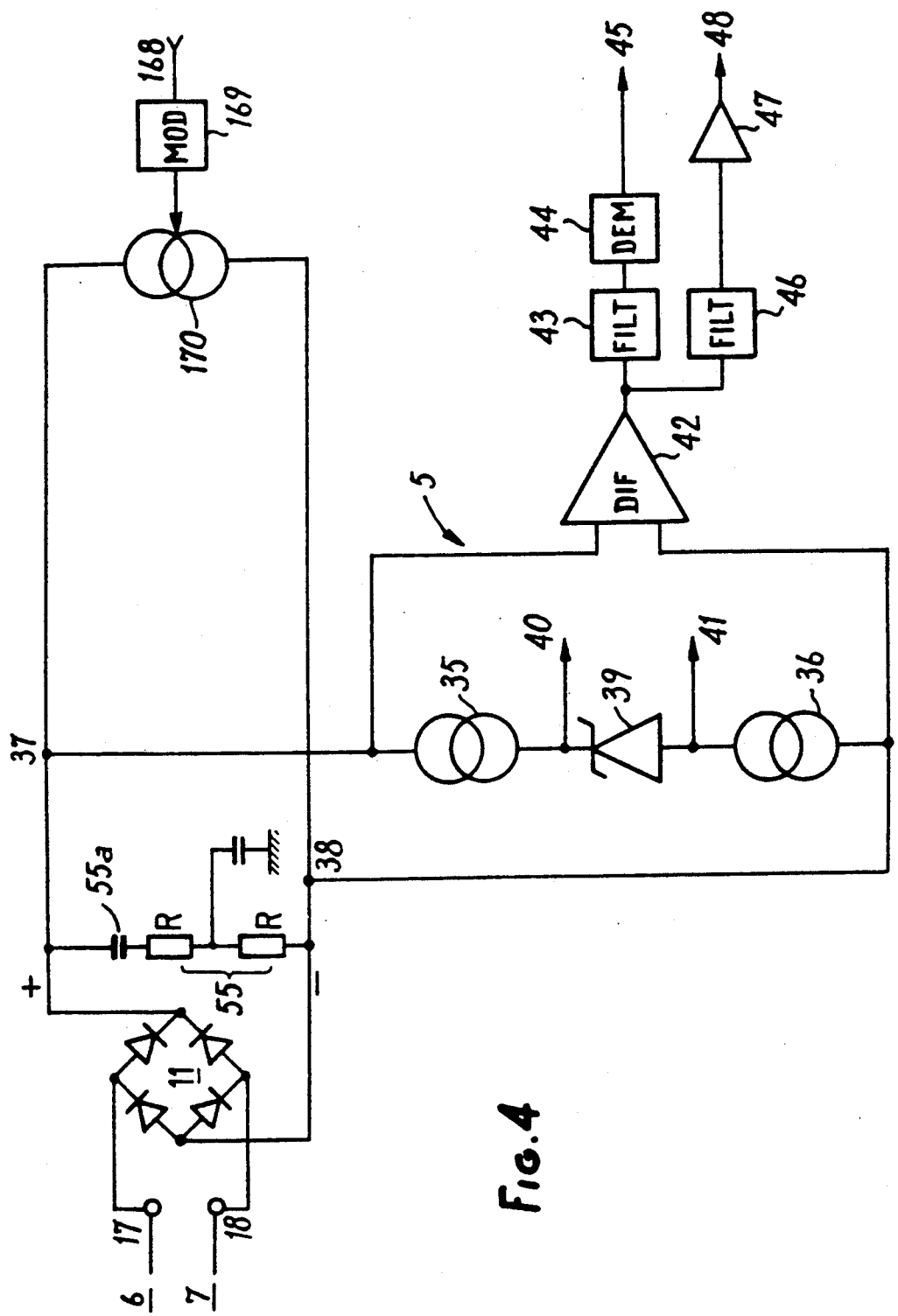
FIG. 4 shows also in greater detail the device receiver assembly.

In FIG. 4 is shown a receiving assembly of the device, with an impedance unit 55 and a capacitor 55a, identical to impedance unit 25 and capacitor 25a of the transmitter assembly. Two current generators 35 and 36, whose power feed is instead coupled to the lines 6 and 7 at 37 and 38, respectively, are situated to produce the proper voltage at points 40 and 41. Impedance unit 55 and the two generators 35 and 36 in series are mounted in parallel between terminals 37 and 38 of a diode bridge 11, the other two terminals of which being connected at 17 and 18 to the two wires 27 of the transmission line. As already indicated, said diode bridge is used for avoiding the disadvantage of a possible polarity inversion during assembly, so as to receive on generators 35 and 36 the signals delivered by the transmitter generators 23 and 24.

Generators 35 and 36 are separated by a voltage limiter of the Zener diode 39 type. At the terminals 40 and 41 of said diode is collected the feeding voltage for the various circuits of the receiver assembly.

To terminals 37 and 38 of generators 35 and 36 are thus connected a differential amplifier 42. At the output of said amplifier is two output channels. One includes a pass-band filter 43 and a demodulator 44, the output 45 of which supplies to any user the audio signal injected at 30 at the input of transmitter 4 (FIG. 3). On the other channel, the signal flows through a rejection filter 46 eliminating the audio subcarrier and supplying, after having passed through an amplifier 47, on an output 48, the video signal such as it had been injected to the transmitter at 29. The output 48 can be a standard output for video signals, at 75 ohms.

The present device allows transmitting in the reverse direction signals received by receiver 5 concerning other information, for example remote control signals. In this case, one can advantageously foresee that said signals, received at 168 from an appropriate source (not shown), first modulated in a modulating circuit 169, control thereafter the voltage of a current generator 170 operating symmetrically, mounted in parallel with the receiver assembly 5 between terminals 37 and 38.

By analogy with FIG. 3, it should be stressed that it is possible to mount at the output of the differential amplifier 42 as many channels as required for allowing the reception of a corresponding number of signals representing distinct information, whereby said signals can be modulated or not, as the case may be. Likewise, it is obvious that it is also possible to directly connect to output 48 any type of apparatus using said signals, for example a television set having a video input or a monitor.

Figure 5:
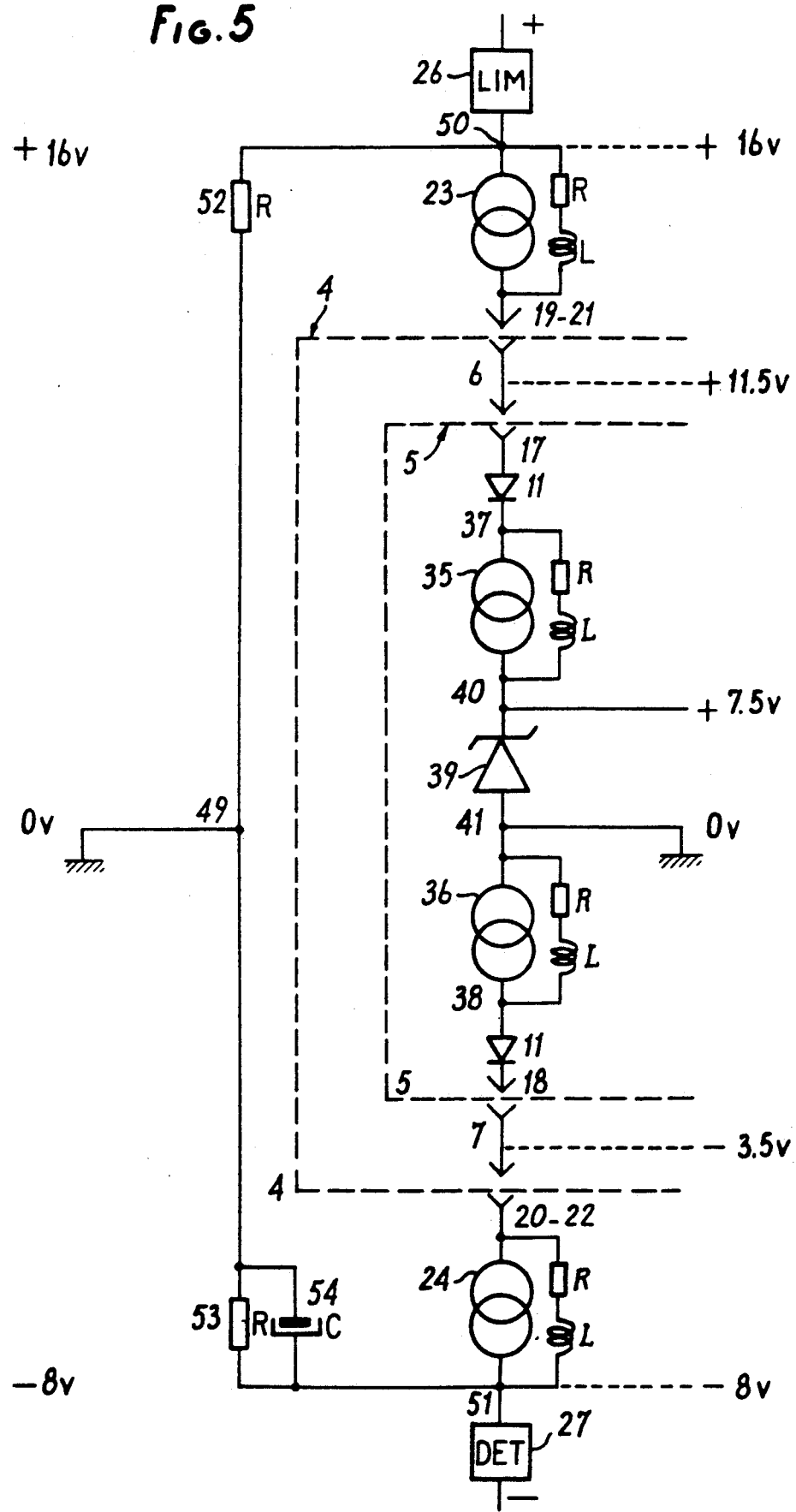
FIG. 5 is a block diagram of the device which allows to better understand the implementation of the means which also provide, according to the invention, the voltage balancing of the device.
Figure 6:
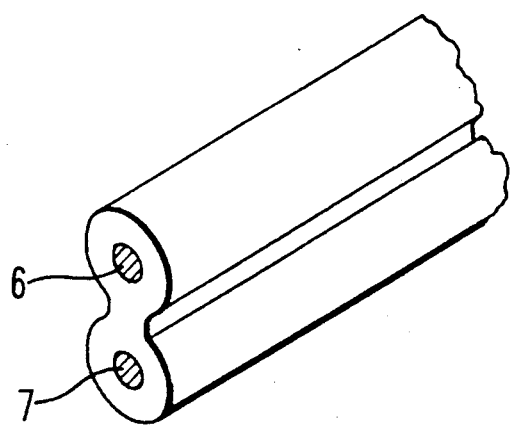
FIG. 6 is a diagram of the twin-wire transmission line.

FIG. 5 shows the means used in the present device for completing the balancing of the voltages set in operation. In FIG. 5, the elements which were essential in previous FIGS. 2, 3 and 4 have been shown again, by indicating, from the positive power feed of the transmitter up to the negative power feed, the evaluation of the voltages adopted, the values of said voltages being of course purely indicative. For the very low frequency components or the continuous component of the voltages on the generators, the latter can behave as resistors. On each generator is shown, mounted in parallel, a resistor R and an inductance coil L symbolizing together the circuits used.

Therefore, one will find in the same order, from top to bottom, corresponding to the decreasing voltages from the positive to the negative, current limiter 26, generator 23, terminal 19, transmission wire 6, terminal 17, one of the active diodes of diode bridge 11, terminal 37, generator 35, terminal 40, Zener diode 39, terminal 41, generator 36, terminal 38, the other active diode of diode bridge 11, terminal 18, transmission wire 7, terminal 20 and generator 24.

The dashes passing by terminals 17, 18, 19, 20 bound symbolically transmitter 4 and receiver 5.

The symmetrical transformers with magnetic cores have been omitted here and are assumed to be included in the transmission line. Also, the impedance units 25 and 55 have also not been shown.

The assembly shown forms a voltage divider, here between +16 V and −8 V, the two wires 6 and 7 being respectively raised to +11.5 V and −3.5 V representing a potential difference of +4.5 V across each of generators 23 and 24. The power feed outputs 40 and 41 of receiver 5 are respectively raised to +7.5 V and to ground, a potential difference of +4 V across generators 35 and 36 and of +7.5 V across the Zener diode 39.

If one wishes ground 41 of receiver 5 and ground 49 of transmitter 4 to be at the same potential, equal to 0 V, it is therefore necessary that the various resistors provide for the balance between terminals 50–49 and 50–41 on the one hand, and 49-51 and 41-51 on the other hand. This voltage balance is accomplished by the proportionality of the equivalent resistors and of complementary resistors 52 and 53, the latter being associated to a capacitor 54 providing for the grounding of the power feed for the alternating signals.

Thus is provided a signal transmission device of very simple design, allowing sending said signals over a long distance in a wide frequency band, from a transmitter receiving said signals towards a receiver them to the user. Said signals can be of any nature and can in particular be video signals in the baseband, most often associated with a modulated audio signal without prejudice to other signals being added to the previous ones. Said signals control the voltage of current generators which, on the transmitter side, energize the transmission line, said generators operating in opposition and being connected to an impedance unit equal to the line characteristic impedance. Said same signals, at the reception, feed the receiver with continuous current and restore the power feed by means of two symmetrical current generators, connected to a Zener diode, the signals at the output passing through a differential amplifier in which they are treated for restoring without interference or modification the input signals. On the other hand, the device allows superimposing to the transmission thus carried out the sending of signals in the reverse direction, for example of the remote control type conveniently modulated, said signals being transmitted in the receiver by an independent current generator, delivering in parallel on the line.

Of course, it is obvious that the invention is not limited to the examples especially described and shown and that on the contrary it encompasses all the variants thereof. In particular, the line leads can be cylindrical and parallel, or flat and placed side by side. Preferably, said wires are kept parallel to one another by an insulating material, allows a uniform characteristic impedance along the line.

I claim:

1. A transmission device for signals, comprising:
   at least one transmitter assembly including first and second current generators mounted in series with a matching impedance;
   at least one receiver assembly including a diode bridge;
   a twin-wire line;
   a symmetrical transformer having a magnetic core mounted on each end of said line connecting said line to said receiver assembly and to said transmitter assembly, the windings of said transformer made from twin-wire cable;
   said first generator being driven by one of said signals to be transmitted and delivering a current symmetrically into one wire of said line;
   said second generator being driven by the inverse of said one of said signals to be transmitted and delivering a current symmetrically into the other wire of said line;
   wherein said line is balanced at each end by an impedance of a value equal to the characteristic impedance of said line, and said matching impedance is of a value equal to the characteristic impedance of said line, and said signals are in a frequency range of 50 Hz to 30 MHz.

2. A device according to claim 1, wherein the two wires (6-7) are identical and have a diameter which is less than or at most equal to 1 mm.

3. A device according to claim 1, wherein the transmitter assembly (4) includes a limiter (26) for the feeding current of generators (23-24).

4. A device according to claim 3, wherein the current limiter (26) is connected to a positive power feed terminal of one of generators (23), a detector (27) being connected to its negative power feed terminal.

5. A device according to claim 1, wherein the twin-wire cable forming the windings of the symmetrical transformers (56-102) is made from the wires (6-7) of the line.

6. A device according to claim 5, wherein the transmitter assembly (4) and the receiver assembly (5) are respectively a receiver and a transmitter.

7. A device according to claim 1, wherein the line wires can be cylindrical, and are kept parallel by means of a common covering made of an insulating material.

8. A device according to claim 1, wherein the matching impedance (25), in series with the generators, includes resistors and a capacitor adapted for separating the continuous component of the signals to be transmitted.

9. A device according to claim 1, wherein the matching impedance (25) of the line is made of two equal impedance units (95-96) mounted in series, a node where said impedance units are joined being connected to ground through a capacitor (97).

10. A device according to claim 1, wherein in each receiver assembly (5), the line matching impedance is mounted in parallel on said line and is made of two equal impedance units mounted in series, a node where said impedance units are joined connected to ground through a capacitor.

11. A device according to claim 1, wherein the receiver assembly (5) includes two current generators (35-36) supplying a feeding current for said receiver assembly.

12. A device according to claim 11, wherein the receiver assembly (5) includes a complementary current generator (170) operating symmetrically having its voltage controlled by modulated signals distinct from those controlling generators (23-24) of the transmitter assembly (4).

13. A device according to claim 12, wherein the modulated signals which control the complementary generator (170) are remote control signals.

14. A device according to claim 11, wherein a voltage limiter (39) is mounted between the two current generators (35-36) of the receiver assembly (4).

15. A device according to claim 14, wherein the voltage limiter (39) is a Zener diode.

16. A device according to claim 11, wherein the current generators (23-24, 35-26) are equivalent to a resistor with respect to the current continuous component.

17. A device according to claim 1, wherein the signals to be transmitted which control the current generators (23-24) of transmitter (4) result from the superimposition of first signals and of second signals, previously modulated and possibly amplified.

18. A device according to claim 1, wherein the signals transmitted to the receiver assembly (4) via line (6-7) pass through a differential amplifier (42) and are separated by filtering (43-46).

* * * * *